UNITED STATES PATENT OFFICE 2,588,400

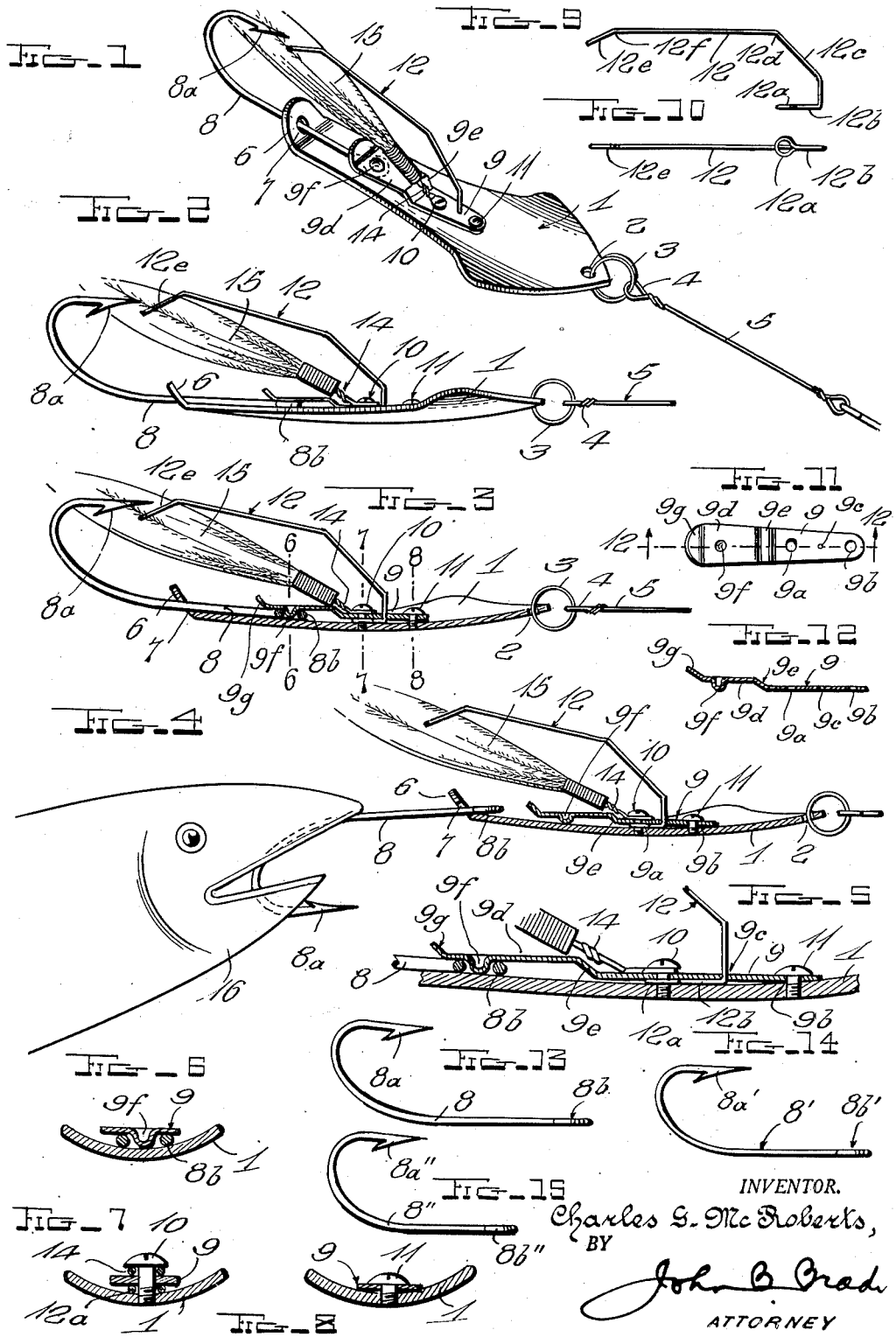

ARTIFICIAL BAIT

Charles G. McRoberts, Brooklyn, N. Y.

Application December 31, 1946, Serial No. 719,493

3 Claims. (Cl. 43—42.04)

My invention relates broadly to artificial bait and more particularly to an improved construction of spoon and associated hook for fishing.

One of the objects of my invention is to provide a construction of improved artificial bait which may be manufactured inexpensively on a quantity production basis and which is highly effective in fishing.

Another object of my invention is to provide an improved construction of artificial bait in which a streamlined spoon is provided with an attachment means serving a multiple function of maintaining the position of a detachable hook, providing securing means for artificial bait and forming a support for a protective guard in association with the artificial bait.

Another object of my invention is to provide an improved construction of spoon having securing means thereon for a detachable and reversible hook which may be employed in either of two positions with respect to the spoon.

Another object of my invention is to provide an arrangement of resilient connection means for a detachable hook and artificial bait and guard therefor which may be readily assembled to form a very effective artificial bait for fishing.

Still another object of my invention is to provide a construction of artificial bait which permits the use of various size hooks for meeting different conditions of fishing.

Other and further objects of my invention reside in the improved form of striker-spoon hook as set forth more fully in the specification hereinafter following by reference to the accompanying drawings in which:

Figure 1 is a perspective view of the artificial bait of my invention; Fig. 2 is a side elevational view of the artificial bait showing the fish hook resiliently maintained in a position preparatory for a strike; Fig. 3 is a longitudinal sectional view taken through the artificial bait structure; Fig. 4 is a longitudinal sectional view of the artificial bait with the fish hook arranged in a reverse position compared to the position of the fish hook illustrated in Figs. 1, 2 and 3, the view showing the fish hook after a strike and displaced to a position in which a fish is ensnared; Fig. 5 is an enlarged fragmentary longitudinal sectional view of the resilient securing means for the detachable hook, the attachment means for the artificial bait and the support for the wire weed guard which is associated with the artificial bait; Fig. 6 is a transverse sectional view taken substantially on line 6—6 of Fig. 3; Fig. 7 is a tranverse sectional view taken substantially on line 7—7 of Fig. 3; Fig. 8 is a transverse sectional view taken substantially on line 8—8 of Fig. 3; Fig. 9 is a side elevational view of the wire weed guard used in the artificial bait construction of my invention; Fig. 10 is a bottom plan view of the wire weed guard shown in Fig. 9; Fig. 11 is a plan view of the retainer plate employed for detachably securing the fish hook in position and positioning the artificial bait and wire weed guard; Fig. 12 is a longitudinal sectional view taken on line 12—12 of Fig. 11; and Figs. 13, 14 and 15 show large size, intermediate size and small size detachable fish hooks which may be selectively employed in association with the artificial bait of my invention.

Referring to the drawings in detail the streamlined spoon is represented at 1 having an eyelet 2 in one end thereof for connection of coupling ring 3 which connects to the loop 4 of fish line 5 allowing free gliding of the spoon 1 through the water. The streamlined shape of the spoon 1 is an important feature of my invention and will be seen more clearly by reference to Figs. 1, 2, 3 and 4. The spoon is shaped to provide a head end and a trailing tail end. The head end is tapered outwardly and then tapered from a maximum transverse direction to the trailing tail end of the spoon. The spoon is curved about the longitudinal axis thereof to facilitate the gliding operation through the water. The end of the spoon 1 is bent forwardly at 6 at substantially an obtuse angle with respect to the body portion of said spoon and is provided with an aperture 7 therein. The aperture 7 is slightly elongated on a longitudinal axis through the spoon and is of such size that the fish engaging and penetrating hook or point end 8a of the fish hook 8 may be readily passed therethrough by slightly tipping the hook end 8a of the fish hook into a position substantially coincident with the axis of the aperture 7 in the spoon 1.

The hook 8 having the fish engaging penetrating point 8a thereon may be reversibly connected with the spoon 1 so that the point 8a may be directed forwardly or rearwardly with respect to the spoon 1. The forward position of the fish hook 8 is illustrated in Figs. 1–3. The rearward position of the fish hook 8 is illustrated in Fig. 4. The fact that fish hook 8 may have the hook end 8a thereof readily passed through the elongated aperture 7 enables fish hooks of various sizes to be readily associated with the spoon 1. This is an important advantage of my invention as different size hooks can be used efficiently under different fishing conditions. A long shanked hook, for example, may be quickly substituted for a short shanked hook on the spoon when fish are "striking short." In Figs. 1–3 and 13 I have illustrated a large size hook 8. Figs. 14 and 15 illustrate hooks of smaller sizes, Fig. 14 showing an intermediate size hook 8' having penetrating point 8a' and looped or eyelet end 8b' while the smaller size hook is shown in Fig. 15 at 8'' having penetrating point 8a'' and looped or eyelet end 8b''.

The spoon 1 has associated therewith a resilient detent and retainer plate or spring strip 9. Retainer plate or spring strip 9 is substantially tapered in its contour from a relatively large end adjacent the trailing end 6 of the spoon to a narrower end adjacent the head of the spoon. The retainer plate or spring strip 9 is apertured at 9a and 9b to permit the passage of securing screws 10 and 11 which pass through the retainer plate or spring strip 9 and are screw-threaded into the spoon 1.

The securing screw 10 performs a triple function by passing through the looped eyelet 12a of the resilient guard wire 12 for centering the wire weed guard 12 with respect to the spoon 1; screw 10 serves as a securing means for retainer plate or spring strip 9 with respect to spoon 1; and screw 10 serves as a securing means for the wire carrier 14 which supports the artificial bait or feather 15.

The wire weed guard 12 has a looped or eyelet end 12a secured directly against spoon 1 by means of the clamping action of retainer plate 9 or spring strip. Retainer plate or spring strip 9 is apertured at 9c intermediate the apertures 9a and 9b for screws 10 and 11. The wire weed guard 12 is provided with a right angular bend 12b therein immediately adjacent the spoon 1 and retainer plate or spring strip 9 so that the eyelet or looped end 12a is spaced from the aperture 9c to precisely align itself with the aperture 9a in retainer plate 9 or spring strip, thereby enabling the screw 10 with the feather support 14 attached thereto to be readily passed through the aperture 9a in the retainer plate or spring strip 9 and into the spoon 1. The wire weed guard 12 is shaped to include an acute angle at the position 12c along the length thereof directed rearwardly toward the trailing end 6 of the spoon 1 and an obtuse angle at the position 12d along the length thereof at which position the guard is directed toward the penetrating point 8b of the fish hook 8 and over the artificial bait or feather 15, terminating in an inturned end 12e formed by the obtuse angle bend 12f along the length of the wire weed guard 12. Thus the artificial bait or feather 15 is protected from contact and entanglement with seaweed and other obstructions and the hook point 8a is protected against catching on weeds when the spoon 1 is in operation.

The retainer plate or spring strip 9 is shown more clearly in Figs. 11 and 12 and is fastened adjacent the narrow end thereof by screw 11 which extends into the spoon 1. The assembly provided by screws 10 and 11 passing through retainer plate 9 or spring strip serves to clamp the wire weed guard 12 in a position directly over the artificial bait or feather 15 and in protective relation to point 8a of hook 8 as heretofore explained. Retainer plate or spring strip 9 has an offset yieldable portion 9d connected with the main body portion of the plate through an inclined shoulder portion 9e. The material of the retainer plate 9 or spring strip is resilient as the plate 9 is stamped from spring steel.

The offset end 9d of retainer plate 9 or spring strip is free and includes a detent 9f directly downwardly from retainer plate 9 or spring strip and an upwardly directed lip portion 9g. The upwardly directed lip portion 9g is sufficiently spaced above the spoon 1 when the detent 9f is engaged in surface contact with the surface of spoon 1 to enable the end portion 9d of the retainer plate or spring strip 9 to be raised at its end 9f sufficiently to permit the looped or eyelet end 8b of hook 8 to be slipped beneath end portion 9d of the retainer plate or spring strip 9 and detachably clamped in position. Similarly the retainer plate or spring strip 9 is sufficiently resilient to enable the looped end or eyelet 8b to be withdrawn longitudinally from the clamped position beneath retainer plate or spring strip 9 whereby the looped end or eyelet 8b rides under detent 9f raising the detent and releasing the looped end or eyelet 8b. Hook 8 under these conditions is free to slide longitudinally of the spoon 1 under the force of a fish ensnared on the penetrating end 8a of hook 8 until the looped or eyelet end 8b reaches the obstruction offered by the confining aperture 7 in the trailing end 6 of spoon 1. In this position a strike occurs and the penetrating end 8a drives into the fish.

Under the various conditions encountered in different fishing areas and the various kinds of fish encountered in different geographical areas I have found that it is advantageous at times to reverse the position of the hook 8. This may be explained by considering the variations in the fleshy and bony structure of the fish wherein it is under certain conditions desirable to ensnare the lower jaw of the fish and under other conditions to ensnare the upper jaw of the fish. Accordingly, the structure of the fish hook mounting means is such in my invention that the fish hook may be retained with the hook end extending upwardly with respect to the spoon 1 as represented in Figs. 1, 2 and 3 or the fish hook may be displaced to a position with the hook end extending downwardly with respect to the spoon 1 as illustrated in Fig. 4. It will be observed that the structure of the fish hook and the coacting structure of the spoon are symmetrical to the extent of permitting the mounting of the fish hook 8 either with the hook end extending upwardly or downwardly with respect to the spoon, the looped end or eyelet 8b thereof in both instances being detachably supportable beneath the detent 9f as shown in Figs. 1–5.

Fig. 4 represents more clearly the conditions existing after a strike wherein the lower jaw of fish 16 has been penetrated by the penetrating end 8a of fish hook 8 and the lower or eyelet end 8b of fish hook 8 has been detached from the connection with detent 9f and is supported by abutment of looped or eyelet end 8b of the fish hook against the apertured trailing end of the spoon 1. The aperture 7 is so shaped that hook 8 cannot escape from spoon 1 by pulling on hook 8a, completely eliminating any possibility of accidental displacement of the hook and escape of the fish with the hook. The hook can only be detached by a manual manipulation of removing the hook end 8a through aperture 7.

I have found the structure of the artificial bait of my invention very practical for manufacture and production at low cost on a mass scale. While I have illustrated a preferred embodiment of my invention, I realize that modifications in detail may be made and I desire that it be understood that no limits upon my invention are intended other than may be imposed by the scope of the appended claims.

What I claim as new and desire to secure by Letters Patent of the United States is as follows:

1. An artificial bait comprising a streamlined spoon connected at its leading end with a fish line and apertured at the trailing end thereof for the introduction and removal of the hook ends of various size fish hooks, each fish hook having an eyelet on one end and a hook on the other end, an artificial bait member, a wire weed guard for said artificial bait member, and a spring strip secured adjacent one of its ends to said spoon and forming a fastening means for said artificial bait member and said wire weed guard, said spring strip being yieldably spaced adjacent its opposite end with respect to said spoon for detachably maintaining the eyelet end of a fish hook in position with respect to said spoon.

2. An artificial bait comprising a streamlined spoon connected at its leading end with a fish line and apertured at the trailing end thereof for the introduction and removal of the hook ends of various size fish hooks, each fish hook having an eyelet on one end and a hook on the other end, an artificial bait member, a wire weed guard for said artificial bait member, a spring strip extending longitudinally of said spoon, said wire weed guard passing through an opening in said spring strip and terminating in an eyelet at one end, and securing means for mounting said spring strip with respect to said spoon, said securing means being connected with said artificial bait member and extending through said spring strip and through the eyelet end of said wire weed guard and being connected with said spoon, and a detent on said spring strip for detachably engaging the eyelet end of a fish hook introduced through the apertured end of said spoon.

3. An artificial bait comprising a streamlined spoon connected at its leading end with a fish line and apertured at the trailing end thereof for the introduction and removal of the hook ends of various size fish hooks, each fish hook having an eyelet on one end and a hook on the other end, an artificial bait member, a wire weed guard for said artificial bait member, said wire weed guard terminating in an eyelet end formed substantially normal to the axis of a portion of the wire weed guard and extending adjacent said spoon, a spring strip, and a pair of fastening means connecting said spring strip to said spoon, one of said fastening means being connected with said artificial bait member and extending through the eyelet end of said wire weed guard for maintaining said artificial bait member and said wire weed guard in operative relation to said spoon, the free end of said spring strip having a detent therein and an outwardly directed lip extending therefrom for facilitating the displacement of said detent away from said spoon for permitting the engagement of the eyelet end of a fish hook inserted through the apertured end of said spoon preparatory to disengagement in event of a strike.

CHARLES G. McROBERTS.

REFERENCES CITED

The following references are of record in the file of this patent:

UNITED STATES PATENTS

| Number | Name | Date |
| --- | --- | --- |
| 1,682,711 | Pflueger | Aug. 28, 1928 |
| 1,700,332 | Pflueger | Jan. 29, 1929 |
| 1,939,291 | Buddle | Dec. 12, 1933 |
| 1,987,839 | Moilanen | Jan. 15, 1935 |
| 2,145,283 | Accetta | Jan. 31, 1939 |
| 2,167,163 | Toepper | July 25, 1939 |
| 2,196,555 | Heiman | Apr. 9, 1940 |
| 2,197,209 | Eppinger | Apr. 16, 1940 |
| 2,203,473 | Shannon | June 4, 1940 |
| 2,208,827 | Accetta | July 23, 1940 |